United States Patent [19]

Futaba

[11] Patent Number: 4,619,155
[45] Date of Patent: Oct. 28, 1986

[54] RACK AND PINION STEERING DEVICE

[75] Inventor: Takeshi Futaba, Yao, Japan

[73] Assignee: Koyo Jidoki Kabushiki Kaisha, Nara, Japan

[21] Appl. No.: 485,178

[22] Filed: Apr. 15, 1983

[30] Foreign Application Priority Data

Apr. 15, 1982 [JP] Japan .................................. 57-61712
Oct. 6, 1982 [JP] Japan ................................. 57-174668

[51] Int. Cl.$^4$ ..................... F16H 1/04; B62D 1/20; B62D 5/06
[52] U.S. Cl. ...................................... 74/498; 74/422; 180/148
[58] Field of Search ...................... 74/498, 422, 89.17; 180/148

[56] References Cited

U.S. PATENT DOCUMENTS

| | | | |
|---|---|---|---|
| 2,814,364 | 11/1957 | Lowe | 188/148 |
| 4,008,627 | 2/1977 | Bradshaw et al. | 74/498 |
| 4,016,774 | 4/1977 | Baker et al. | 74/498 X |
| 4,095,482 | 1/1978 | Kirschner | 74/498 |
| 4,106,363 | 8/1978 | Buckingham | 74/498 |
| 4,116,085 | 9/1978 | Bishop | 74/498 X |
| 4,127,186 | 11/1978 | Koyano et al. | 74/498 X |
| 4,187,736 | 2/1980 | Haegele | 74/498 X |
| 4,189,955 | 2/1980 | Bishop | 74/498 |
| 4,299,302 | 11/1981 | Nishikawa et al. | 74/498 X |
| 4,322,986 | 4/1982 | Adams et al. | 74/498 X |
| 4,400,991 | 8/1983 | Breitweg et al. | 74/498 |
| 4,444,070 | 4/1984 | Yanai | 74/498 X |
| 4,475,413 | 10/1984 | Higuchi | 74/498 X |

FOREIGN PATENT DOCUMENTS

| | | | |
|---|---|---|---|
| 943916 | 12/1963 | United Kingdom | 74/89.17 |
| 946501 | 1/1964 | United Kingdom | 74/498 |
| 971490 | 9/1964 | United Kingdom | 74/498 |

Primary Examiner—Kenneth J. Dorner
Assistant Examiner—Michael D. Bednarek
Attorney, Agent, or Firm—Robert E. Burns; Emmanuel J. Lobato; Bruce L. Adams

[57] ABSTRACT

A rack and pinion steering device which comprises a pinion operatively connected to a steering shaft of a vehicle, a long rod-like rack operatively connected to a steering lever mechanism of wheels of the vehicle, said rack having a group of rack teeth meshed with said pinion, and a spring device in contact with the back of said rack on the side opposite said pinion to resiliently bias said rack against said pinion. Said group of rack teeth includes a first portion close to and a second portion away from a center of said rack lengthwise which portions are defined symmetrically on opposite sides of said center, and said both second portions have a reference pitch line which inclines so as to approach the axis of said rack as it is away from said first portion adjacent thereto, whereby said rack gives rise to a flexure displacement under bending pressure caused by said spring device in connection with the meshed position between the rack and the pinion on said group of rack teeth.

9 Claims, 9 Drawing Figures

RACK AND PINION STEERING DEVICE

FIELD OF THE INVENTION

The present invention relates to a rack and pinion steering device for an automobile, and more particularly, to a rack and pinion steering device of the type in which the torque required to rotate a steering wheel when a vehicle runs straight on is different from that when the vehicle runs along a curve.

A well-known rack and pinion steering gear has a pinion operatively connected to a steering shaft and a rack operatively connected to a steering lever mechanism of the wheels. The pinion is meshed with rack teeth on the rack to transmit linear motion proportional to an angle of rotation of the steering shaft to the steering lever mechanism. When the pinion is meshed with the tooth nearly in the midst of a group of rack teeth, the vehicle runs straight on, and as the meshed position is deviated from the center to the left or right end of the group of rack teeth, the vehicle gradually runs along the curve having a small curvature. In a typical example, the pinion has an angle of overall rotation, 1,440°, and the rack is provided with rack teeth which allow such a rotation of the pinion. In the ensuing description, the central portion of the group of rack teeth is referred to as the "true straight-on running position", and a position spaced from the true straight-on running position to a position generally apart ±90° to ±180° in angle of rotation of the pinion is referred to as the "neighbourhood of straight-on running position". And a faraway region from the neighbourhood of the straight-on running position to both ends of the group of rack teeth is referred to as the "curve running region". It should be understood that the term "neighbourhood of straight-on running position" herein used includes the true straight-on running position.

DESCRIPTION OF THE PRIOR ART

It is desirable that the torque required to rotate the steering wheel is varied depending on the running condition of the vehicle, and it is known that preferably, the torque is made great under the condition wherein the vehicle runs straight on, and the torque is made small when the vehicle turns along a large curve to the left or right. In a large curve, the steering wheel must be turned through more than 360°, but where such a steering angle is greatly operated, the vehicle speed is generally low and the wheel becomes heavy in view of the steering mechanism, which is desirably relieved. Under the condition wherein the vehicle often runs straight on at high speeds, it is important to make the operating torque of the wheel relatively great in view of prevention of accidents due to the unsteady steering wheel. In the rack and pinion steering device, the rotating torque in the steering wheel may be adjusted by control of back-lash between the rack and pinion or by control of slip friction of the rack. That is, when the pinion is meshed with the neighbourhood of straight-on running position on the rack, the back-lash is removed or reduced, and when meshed with the other regions (curve running region), the back-lash is imparted or increased.

In Japanese Patent Application Laid-Open No. 8922/74 issued on Jan. 26, 1974, there is proposed an arrangement wherein a taper portion having a gentle mountaineous inclined surface is formed in the back of a rack and there is provided a spring device in engagement with the back of the rack. The taper portion extends, with a portion corresponding to the true straight-on running position on the group of teeth of the rack being an apex, from said portion to a portion corresponding to a part of the curve running region. The spring device is provided opposite the pinion and includes a supporter in slip contact with the back of the rack and a compression coiled spring for urging the supporter against the rack. As the position where the rack is meshed with the pinion is deviated from the neighbourhood of the straight-on running position on the group of rack teeth to the curve running region, a drag of the spring device acting on the back of the rack decreases, and therefore, it is obvious that the back-lash and the slip friction of the rack can be controlled.

In Japanese Patent Application Laid-Open No. 138239/79 issued on Oct. 26, 1979, there is proposed an arrangement wherein an extensible hydraulic chamber is provided within a spring device in place of formation of a taper portion in the back of a rack, and the pressure of the hydraulic chamber is controlled in connection with the number of revolutions of the engine. In the proposed apparatus, when the vehicle runs at a high speed, the rotating resistance acting on the steering shaft can be made great whereas when the automobile stops or runs at a slow speed, the rotating resistance can be made small. However, between the straight-on running and the curve running, it is impossible to relatively vary the rotating resistance.

In the first-mentioned prior art, the back-lash between the pinion and rack teeth has its meshed position which sequentially varies between a minimum value at the time of the true straight-on position on the group of rack teeth and a maximum value at the time of the curve running position, and the slip friction between the rack and the spring device indicates a trend reversely to the former. Such a characteristic is convenient in operability of the steering wheel whereas it is conversely unfavorable in stability, that is, a property in which the steering wheel naturally tends to be returned to the straight-on position after turning a curve. Japanese Patent Application Laid-Open No. 91535/76 issued on Aug. 11, 1976 has proposed means exactly reverse to the solving means in the first-mentioned Japanese Patent Application Laid-Open No. 8922/74 to improve the stability of the steering wheel. That is, the gentle concave portion is formed in the back of the rack and there is provided the spring device in engagement with the back. In this case, the deepest portion of the concave portion is in coincidence with the true straight-on running position. While there is obviously an inconsistency between these two proposals which are contrary to each other, it is generally recognized that in the actual driving performance, the former is useful. Particularly under the condition where the automobiles runs straight on, it is desired that the torque required to turn the steering wheel is greater, and more specifically, while the meshed position between the rack and the pinion is in the neighbourhood of the straight-on running position on the group of rack teeth, the torque may well be critically great with respect to the curve running region. In this respect, the solving means according to the prior arts can realize the functional variation from the true straight-on position towards the curve running region but is insufficient to critically increase the rotating resistance in the neighbourhood of the straight-on running position with respect to the curve running region.

SUMMARY OF THE INVENTION

It is a general object of the present invention to provide a rack and pinion steering device in which where meshing between a rack and a pinion is in the neighbourhood of the straight-on running position on a group of rack teeth, the torque required to turn a steering wheel is made great as compared with the case where the meshing is in the curve running region, and the steering wheel has a nature to be liable to return to the true straight-on running position.

It is a specific object of the present invention to provide a rack and pinion steering device in which the torque required to turn a steering wheel is great in the case where the meshing between a rack and a pinion is in the neighbourhood of the straight-on running position on a group of rack teeth and is small in the case where the meshing position is in the curve running region, the difference therebetween being relatively critical.

It is another object of the present invention to provide a rack and pinion device in which even when the pinion is temporarily locked at the true straight-on running position on a group of rack teeth and moved way from said position in either direction of both sides, the torque required to turn a steering wheel is maximal, whereby the device has a nature so as to hold the steering wheel under the straight-on running condition.

In accordance with the present invention, there is provided a rack and pinion device comprising a gear housing; a pinion rotatably supported within the gear housing and operatively connected to a steering shaft of a vehicle; a long rod-like rack operatively connected to a steering lever mechanism of the wheels of the vehicle, the rack having a group of rack teeth meshed with the pinion; and a spring device in contact with the back of the rack on the side opposite the pinion to resiliently bias the rack against the pinion. The group of rack teeth includes, on opposite sides of a center thereof lengthwise, a first portion near to and a second portion far from the center respectively symmetrically defined, the second portion having a reference pitch line which inclines so as to approach an axis of the rack as it is away from the adjacent first portion whereby the rack brings forth a flexure displacement under bending pressure of the spring device in connection with a meshed position thereof with the pinion on the group of rack teeth. The spring device comprises a cylinder connected to the gear housing, the cylinder having an axis perpendicular to the axis of the pinion and which one end forms a cylinder space open to the rack, an end member for closing the other end of the cylinder space, a plunger slidably mounted within the cylinder space and having one end in frictional engagement with the back of the rack, and first and second springs retained between the plunger and end member to resiliently bias the plunger against the rack. The effective distance on which the first spring acts is relatively small with respect to the effective distance on which the second spring acts so that if an amount of flexure displacement in the rack is less than a predetermined value, the resultant pressure of the first and second springs is applied to the rack whereas if the amount of flexure displacement exceeds a predetermined value, only the pressure of the second spring is applied to the rack.

In the present invention, variation of the reference pitch line in the second portion of the group of rack teeth is achieved by two methods as follows: In the first method, transposition is imparted to a part or whole of the group of rack teeth to relatively control the amount of transposition (including 0) for each part. In this first mode, assume that the amount of transposition in the first portion about the center of the group of rack teeth is 0, and negative transposition which gradually increases as it is away from the first portion on the relevant side is imparted to the second portion. In the group of rack teeth having such a tooth form of transposition, the crests of the teeth are distributed within the same plane. According to the second method, the height of the tooth face with respect to the axis of the rack is controlled without imparting the transposition. Any of these methods can be realized merely by slight adjustment of a gear cutter in a well known manner. Desireably, the first spring used in the present invention is a belleville spring which is great in spring constant and small in effective distance, and suitably, the second spring is a compression coiled spring which is relatively small in spring constant and relatively great in effective distance.

DESCRIPTION OF THE PREFERRED EMBODIMENTS

Figure 1:
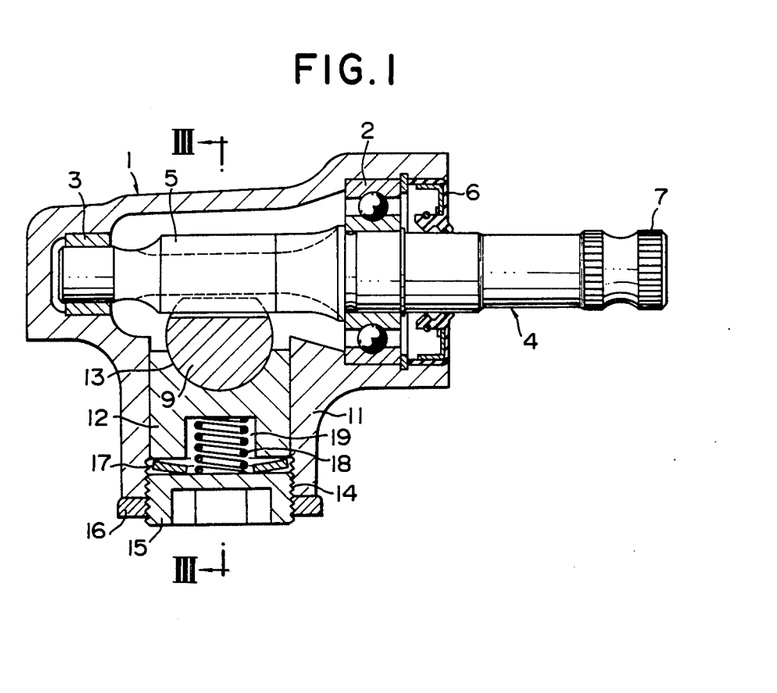
FIG. 1 is a sectional view of a rack and pinion steering device in accordance with the present invention taken on an axis of the pinion.
Figure 3A:
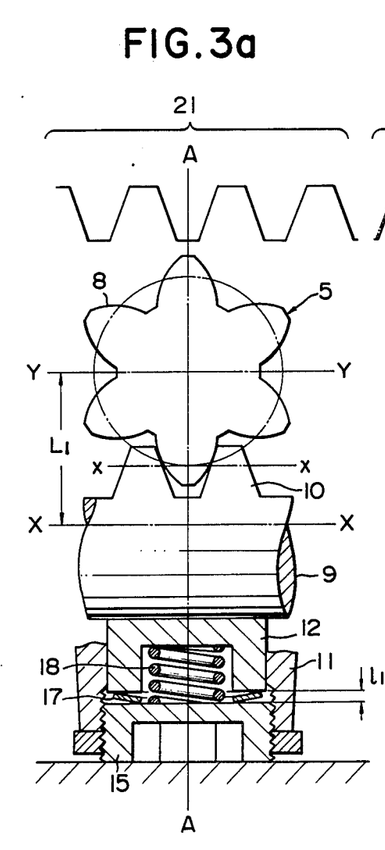
FIGS. 3(a) and (b) are respectively explanatory views of a first embodiment of the rack and pinion steering device in accordance with the present invention, in the form of a section taken along line 3—3 of FIG. 1, showing the state of meshing with the pinion in the straight-on running position and curve running region, respectively, on the group of rack teeth.

Referring now to FIG. 1, a gear housing 1 has a pair of bearings which comprise a ball bearing 2 and a bearing metal 3 which rotatably support a pinion shaft 4. The pinion shaft 4 has a pinion 5 between the pair of bearings 2 and 3 and a connecting end 7 which projects from the housing 1 through a seal member 6, the pinion shaft being operatively connected at the end 7 to a steering shaft not shown. The pinion 5, which is not illustrated in detail because it is well known, has a plurality of teeth 8 as shown in FIG. 3a. Within the housing 1 is provided a rack 9 which cooperates with the pinion 5. The rack 9 is in the form of a long rod having along one side a plurality of teeth 10 meshed with the teeth 8 of the pinion 5. The rack rod 9, which is not illustrated in detail because it is also well known, has both ends projected and extended from the housing 1, which ends are operatively connected to a steering lever mechanism not shown. In this case, in a normal type, the extended end of the rack rod 9 extends through a sleeve (not shown) secured to the housing and is slidably supported by means of a plurality of bushes (not shown) provided in the housing 1. The rack rod 9 is made of a material having a considerably great ridigity, for example, such as bar steel, but the rod, because the distance between the bushes located on opposite sides of the gear housing is relatively great, can be flexed to some extent when external force is applied.

The gear housing 1 is integrally formed with a cylinder block 11, which defines a cylinder space having an axis perpendicular to an axis of the pinion 5. A plunger 12 is slidably fitted in the cylinder space, the plunger having one end formed into a bearing surface 13 which may be slidably placed in contact with the back of the rack 9. The cylinder block 11 has an end formed with internal tooth threads 14, and an end member 15 for closing the cylinder space threadedly engages the threads 14. The end member 15 includes a lock nut 16. Two springs 17 and 18 are coaxially mounted between the plunger 12 and the end member 15 to resiliently bias the plunger against the rack 9. One spring 17 comprises a belleville spring and the other spring 18 comprises a compression coiled spring. The coiled spring 18 is located within a hole 19 formed in the other end of the plunger 12, and the belleville spring 17 is located about the other end of the plunger 12. The effective distance on which the belleville spring 17 acts is apparently small with respect to the effective distance on which the coiled spring 18 acts. Spring 17 constant of the belleville spring is relatively larger than that of the coiled spring 18.

Figure 2:
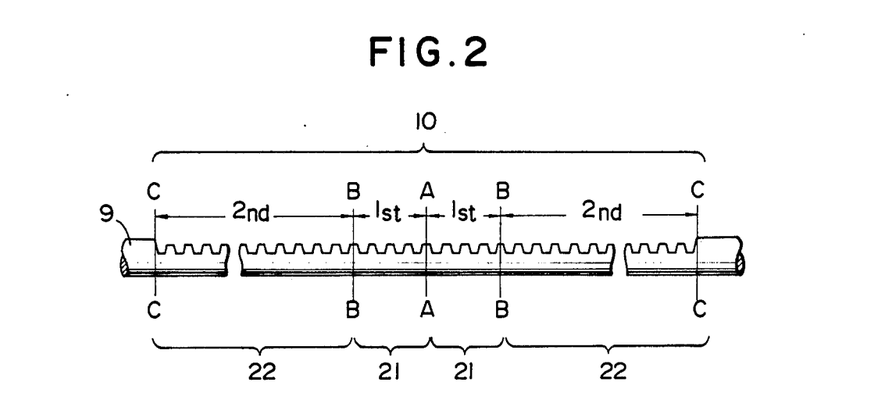
FIG. 2 is a side view of the rack shown in FIG. 1.

Referring to FIG. 2, an essential portion of the rack rod 9 shown in FIG. 1 is shown by the side view. A group of rack teeth 10 comprises a first portion 21 and a second portion 22 respectively defined on opposite sides of a center A—A lenghwise thereof. Both the first portions 21 are defined between positions B—B extending through a predetermined distance from the center A—A in a direction opposite to each other, and both the second portions 22 are defined between end positions C—C from each position B—B. When the pinion 5 is meshed with the center A—A of the group of rack teeth 10, the vehicle is evidently placed under the straight-on running condition, and as the meshed position deviates to the left and right from the center A—A, the vehicle gradually changes its condition to the curve running condition having a small curvature. For the sake of explanation, in the following description, the center A—A of the group of rack teeth 10 is referred to as the true straight-on running position, both first portions 21 between both positions B—B from the center A—A are referred to as being in the neighbourhood of the straight-on running position, and both second positions 22 between both end positions C—C from both positions B—B are referred to as the curve running region. Both first portions 21 about the true straight-on running position which define the neighbourhood of the straight-on running position have a parallel reference pitch line having a given distance with respect to the axis of the rack 9, and both second portions 22 which define the curve running region on the side opposite each other in the neighbourhood of the straight-on running position have a reference pitch line which inclines so as to approach the axis of the rack 9 as they extend away from the adjacent first portions 21. Each curve running region 22 having such an inclined reference pitch line may be formed in the following two manners.

Figure 3B:
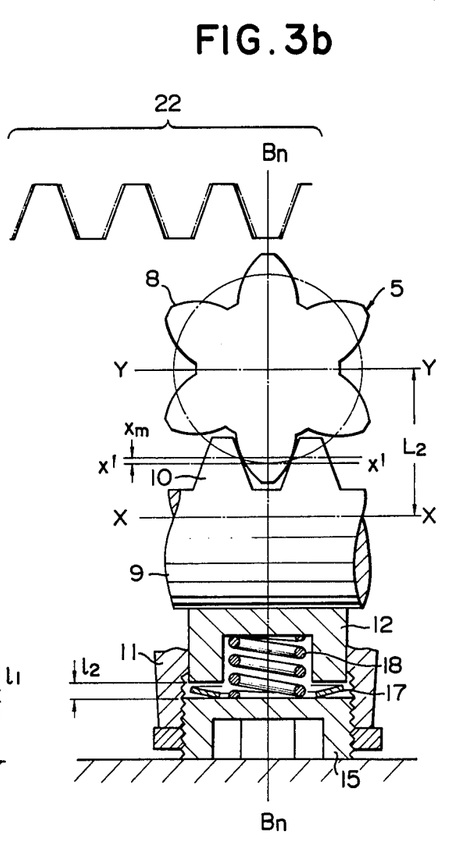

FIGS. 3a and 3b show the first manner. FIG. 3a illustrates the meshing state of the pinion 5 in the true straight-on running position A—A on the group of rack teeth 10, and FIG. 3b likewise illustrates the meshing state of the pinion 5 in suitable position Bn—Bn of the right curve running region on the same group of rack teeth 10. In the first manner, the rack teeth of each curve running region 22 have relatively negative transposition with respect to the rack teeth of the neighbourhood of straight-on running position 21, and an amount of transposition increases as it is away from the neighbourhood of straight-on running position 21. In the illustrated embodiment, the group of rack teeth in the neighbourhood of the straight-on running position 21 has no transposition and the reference pitch line x—x thereof is in a parallel relation having a given distance with respect to the axis X—X of the rack 9, and therefore, if the pinion 5 is meshed in the neighbourhood of the straight-on running position 21 with the group of rack teeth 10, the distance L1 between the axis X—X of the rack 9 and the imaginary line Y—Y perpendicular to the axis of the pinion is constant. On the other hand, the rack teeth of each curve running region 22 have absolutely negative transposition which progressively increases as the distance from the neighbourhood of the straight-on running position increases, and each rack tooth of the curve running region 22 gradually widens its space and reduces its thickness, and therefore, the reference pitch line x'—x' in the curve running region 22 approaches the axis X—X of the rack 9 through a transposition amount xm (where x is the coefficient of transposition) with respect to the reference pitch line x—x of the rack teeth in the neighbourhood of the straight-on running position 21. In this case, since the rack 9 is resiliently biased against the pinion 5 by means of a spring device including the plunger 12 provided on the side opposite the pinion 5, if the pinion 5 is meshed with each curve running region 22 on the group of rack teeth 10, the axis X—X of the rack 9 gives rise to a flexure displacement and the distance L2 between the axis X—X and the imaginary line Y—Y perpendicular to the axis of the pinion 5 decreases as the meshed position deviates towards the rack teeth in directions away from the neighbourhood of the straight-on running position, and conversely, the amount of displacement $l_2$ of the plunger 12 increases. However, such an explanation is a mere example, and in the present invention, as far as negative transposition which the group of rack teeth of both curve running regions 22 progressively increases is relatively imparted to the neighbourhood of straight-on running position 21, it is apparent that such a relative relation may be changed, and the relation therebetween can be either positive and negative or negative and negative.

Figure 4A:
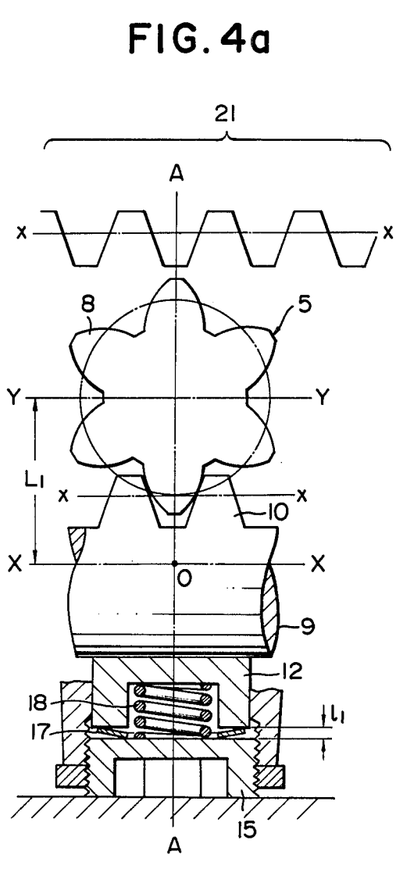
FIGS. 4(a) and (b) are explanatory views of a second embodiment of the rack and pinion steering device in accordance with the present invention, which respectively correspond to FIGS. 3(a) and (b).
Figure 4B:
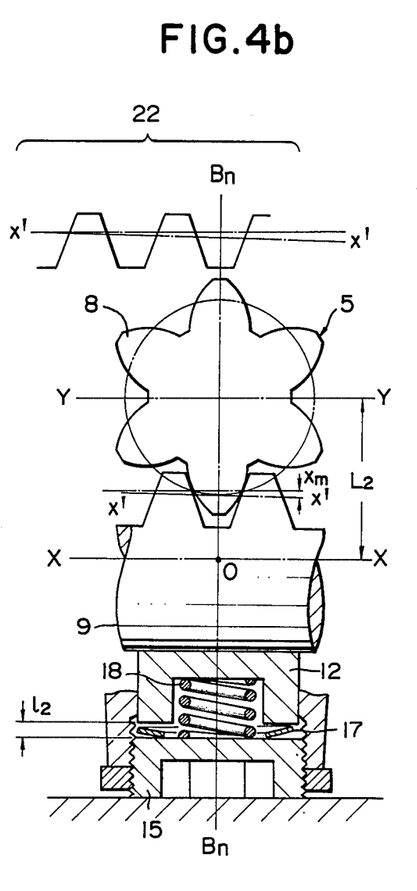

FIG. 4a and FIG. 4b illustrate the second manner for inclining a reference pitch line of the curve running region 22 on the group of rack teeth 10. Like in the case of FIG. 3a and FIG. 3b, FIG. 4a illustrates the meshing condition of the pinion 5 in the true straight-on running position A—A with the group of rack teeth 10, and FIG. 4b illustrates the meshing condition of the pinion 5 in a suitable position Bn—Bn of the curve running region 22 positioned on the right side of the same group of rack teeth 10. In the second manner, each portion 21, 22 of the group of rack teeth 10 has no relative transposition, and instead of this, the top face of the group of rack teeth in each curve running region 22 is distributed along an inclined surface which decreases in distance between the top face and the axis X—X of the rack 9 in a direction extending away from the straight-on running position 21. In this case, since the height of the teeth of the rack teeth of each portion 21, 22 is constant, the reference pitch line x'—x' of the group of rack teeth of the curve running region 22 approaches the axis X—X of the rack 9 through an amount of displacement xm corresponding to an angle of inclination with respect to the reference pitch line x—x in the rack teeth of the neighbourhood of the straight-on running position 21. Similarly to examples shown in FIG. 3a and FIG. 3b, the rack 9 is resiliently biased against the pinion 5 by means of the spring device including the plunger 12 placed on the side opposite the pinion 5, and therefore, if the pinion 5 is meshed with each curve running region 22 on the group of rack teeth 10, the axis X—X of the rack 9 gives rise to a flexure displacement with the result that the distance L2 between the axis X—X and the imaginary line Y—Y perpendicular to the axis of the pinion 5 decreases as the meshed position deviates towards the rack teeth in a direction away from the neighbourhood of the straight-on running position and conversely, the amount of displacement $l_2$ of the plunger 12 increases.

It is obvious that the first embodiment (FIG. 3a and FIG. 3b) as well as the second embodiment (FIG. 4a and FIG. 4b) bring forth substantially the same result. In case the pinion 5 is meshed in the neighbourhood of straight-on running position 21 with the group of rack teeth 10 (FIG. 3a and FIG. 4a), the rack 9 is resilient biased against the pinion 5 by means of the spring device including the plunger 12 but the distance L1 between the rack 9 and the pinion 5 is constant. In this case, the plunger 12 is subjected to both the drags imparted by the belleville spring 17 and coiled spring 18 to maintain a given distance $l_1$ between the plunger and the end member 15. In case the pinion 5 is meshed in the curve running region 22 with the group of rack teeth 10 (FIG. 3b and FIG. 4b), the rack 9 gives rise to a flexure displacement corresponding to the amount of displacement xm under the pressure of the plunger 12, and therefore, the distance L2 between the rack 9 and the pinion 5 progressively decreases in directions extending away from the neighbourhood of the straigt-on running position 21 and accordingly, the distance $l_2$ between the plunger 12 and the end member 15 gradually increases. In this case, the effective distance on which the belleville spring acts is relatively small with respect to the effective distance on which the coiled spring 18 acts, and the effective distance is set to $l_1 + x$ (where $l_1$ is the distance between the plunger 12 in the neighbourhood of the straight-on running position, and x is the suitable number including 0). Accordingly, the rack 9 is subjected to the resultant pressure of the belleville spring 17 and the coiled spring 18 under the condition of $x > xm$ (where xm is the amount of displacement of the rack 9) and is subjected to only the pressure by the coiled spring 18 under the condition of $x \leq xm$. Particular attention is now invited to the fact that if the spring constant of the belleville spring 17 is set considerably larger than the spring constant of the coiled spring 18, a difference of pressure received by the rack 9 between the case $x > xm$ and the case of $x \leq xm$ may be made relatively great. FIG. 3b and FIG. 4b show the state where a limit of action of the belleville spring 17 on the plunger 12 exceeded.

Figure 5:
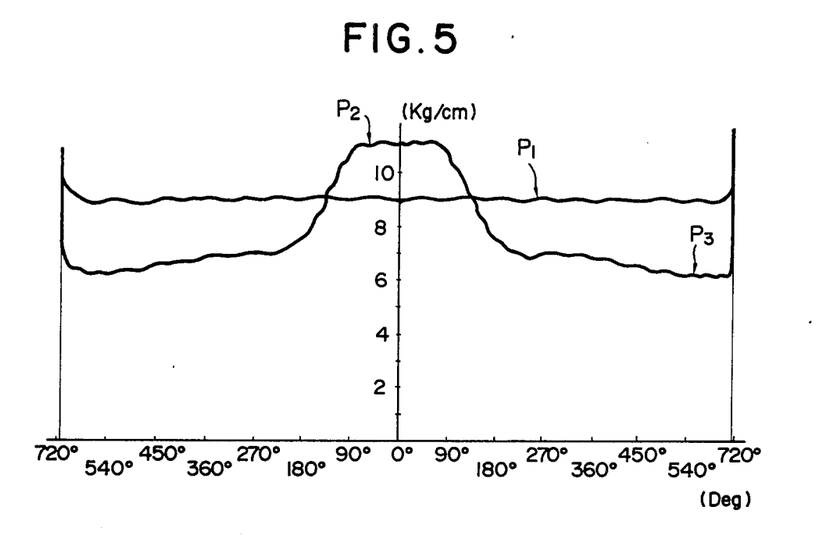
FIG. 5 is a graph indicating variation of torque with respect to an angle of rotation of the pinion in the first and second embodiments.

FIG. 5 indicates the variation of torque with respect to the angle of rotation of the pinion 5 in the first and second embodiments in accordance with the present invention. $P_1$ indicates a normal rack and pinion steering device, and $P_2$ and $P_3$ indicate the device in accordance with the present invention. It is apparent that the torque curve $P_2$ in the neighbourhood of the straight-on running position between 0° and ±90° to 180° in angle of rotation indicates the increased torque with respect to the torque curve $P_3$ in the curve running region.

Figure 6:
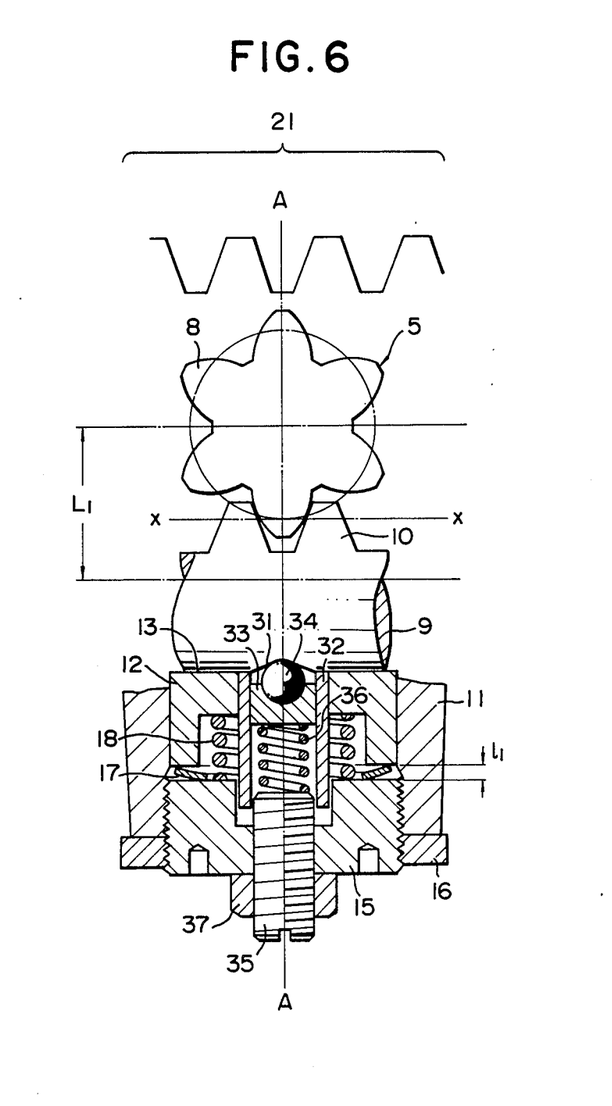
FIG. 6 is an explanatory view of a modified form can be employed in either first or second embodiments.
Figure 7:
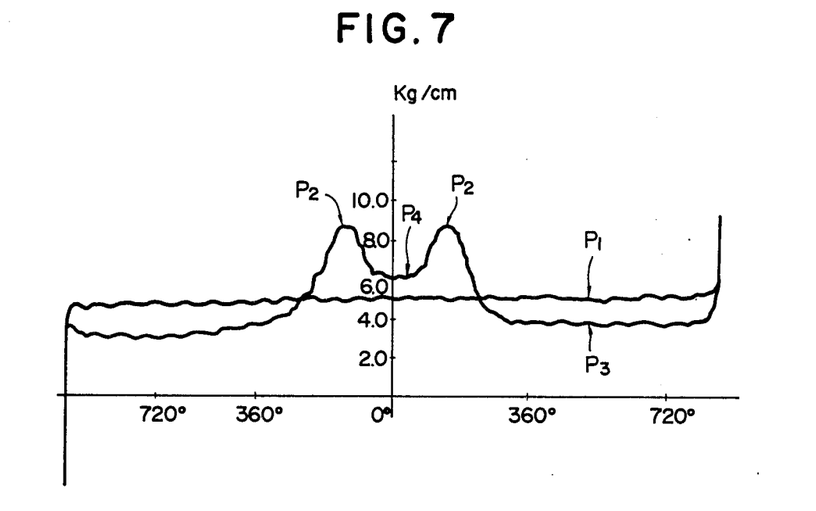
FIG. 7 is a graph indicating the relation between the angle of rotation of the pinion and the variation of torque in the rack and pinion steering device in accordance with the present invention shown in FIG. 6.

FIG. 6 illustrates a modified form which can be applied to either the first or second embodiment, and in FIG. 6, those parts corresponding to parts so far explained have the same reference numerals. A recess 31 having a symmetrical tapered surface is formed in the back of the rack 9 corresponding to the true straight-on running position A—A on the group of rack teeth 10. Secured to the plunger 12 along the axis thereof is a second cylinder 32 one end of which is open towards the back of the rack 9, and a second plunger 33 including a rolling ball or roller 34 is slidably mounted within the second cylinder 32. The end member 15 of the cylinder block 11 has along its axis a tapped hole, and an adjusting screw 35 is provided which passes through the tapped hole and extends into the other end of the second cylinder 32. A third spring 36 comprising a compression coiled spring is arranged between the second plunger 33 and the adjusting screw 35, and the second plunger 33 is resiliently biased against the rack 9 by means of a drag of the third spring 36 so that the rolling ball or roller 34 supported on the second plunger 33 engages the tapered recess 31 formed in the back of the rack 9. Similarly to the aforementioned embodiments, the plunger 12 is resiliently biased against the rack 9 by means of the first and second springs 17 and 18, and the bearing surface 13 provided on one end thereof frictionally engages the back of the rack 9. According to this modified embodiment, in case the pinion 5 is meshed with the true straight-on running position X—X on the group of rack teeth 10, the rack 9 is subjected to the drag of the first and second springs 17 and 18 through the plunger 12 and also subjected to the drag of the third spring 36 through the second plunger 33 including the rolling ball or roller 34. If the meshed position of the pinion 5 is shifted to the left or right from the true straight-on running position A—A on the group of rack teeth, the pressure received by the rack 9 from the plunger 12 involves no substantial change while the meshed position is in the neighbourhood of the straight-on running position, but the drag imparted by the third spring 36 through the rolling roller or ball 34 increases during the period that the rolling roller or ball 34 is displaced by the taper of the recess 31. If the meshed position between the pinion 5 and the rack teeth 10 is shifted from the neighbourhood of the straight-on running position to the true straight-on running position A—A, the pressure received by the rack 9 decreases through a pressure differential of the third spring 36 corresponding to the displacement of the rolling roller or ball 34 caused by the recess 31. This mode may be further clarified by referring to FIG. 7. That is, double-peak curves $P_2$, $P_2$ in the neighbourhood of the straight-on running position are indicated on both sides of the torque curve $P_4$ at the true straight-on running position corresponding to the angle of rotation 0 of the pinion 5. This double-peak curve functions to maintain the steering wheel under the straight-on condition. It is noted that the height of the double-peak may be changed by regulating the pressure of the third spring 36 by means of the adjusting screw 35. However, if such an adjustment is not desired, the adjusting screw 35 can be omitted.

While the preferred embodiments of the present invention have been described in detail, it should be understood that these embodiments merely illustrate examples and are not in any sense to limit the scope of the present invention. Particular attention is invited to the fact that in the foregoing description, the neighbourhood of straight-on running position and the curve running region were said to correspond to the first portion and the second portion, respectively. However, the terms in the neighbourhood of the straight-on running position and the curve running position are rather ideological or conceptional, and the terms in the first portion and second portion are defined in connection with the reference pitch line of the group of rack teeth, which does not always correspond to the neighbourhood of the straight-on running position and the curve running region.

What is claimed is:

1. A rack and pinion device comprising: a gear housing; a pinion rotatably supported within said gear housing and connected during use of the device to a steering shaft of a vehicle; a rod-like rack connected during use of the device to a steering lever mechanism of the wheels of the vehicle, said rack having a lengthwise axis and having a group of rack teeth meshed with said pinion; and a spring device in contact with the back of said rack on the side opposite said pinion to resiliently bias said rack against said pinion; wherein said group of rack teeth includes, in symmetrical relation on opposite sides of the lengthwise center thereof, a first rack teeth portion near to and a second rack teeth portion far from said center respectively, said second rack teeth portion having a reference pitch line which is inclined so as to approach the lengthwise axis of said rack in a direction extending away from the adjacent first rack teeth portion to enable said rack to undergo flexure displacement in response to a bending pressure exerted thereon by said spring device, said spring device comprises a cylinder connected to said gear housing, said cylinder having an axis perpendicular to the axis of said pinion and defining a cylinder space which is open at one end to said rack, an end member for closing the other end of said cylinder space, a plunger slidably mounted within said cylinder space and having one end thereof in frictional engagement with the back of said rack, and first and second springs retained between said plunger and said end member to resiliently bias said plunger against said rack, and wherein the effective distance through which said first spring acts is relatively small with respect to the effective distance through which said second spring acts so that if an amount of flexure displacement in said rack is less than a predetermined value, the resultant pressure of said first and second springs is applied to said rack whereas if the amount of flexure displacement exceeds a predetermined value, only the pressure of said second spring is applied to said rack.

2. A rack and pinion steering device according to claim 1, wherein each second rack teeth portion has teeth having a negative transposition relative to the teeth of the first rack teeth portion and the amount of transposition progressively increases in the direction away from said first portion.

3. A rack and pinion steering device according to a claim 2, wherein each first rack teeth portion has teeth having a zero amount of transposition, and the second rack teeth portion has teeth having an absolutely negative transposition.

4. A rack and pinion steering device according to claim 1, wherein each second rack teeth portion has teeth having top faces lying along an inclined axis relative to the lengthwise axis of said rack such that the distance between the two axes progressively decreases in the direction away from the first rack teeth portion adjacent thereto.

5. A rack and pinion steering device according to claim 1, wherein said first spring comprises a belleville spring and said second spring comprises a compression coiled spring.

6. A rack and pinion steering device according to claim 1, wherein said first spring has greater spring constant than that of said second spring.

7. A rack and pinion steering device according to claim 1, wherein said rack has a tapered recess on the back thereof at a location corresponding to the lengthwise center of the group of rack teeth, and wherein said spring device further comprises a second cylinder secured to said plunger, said second cylinder having one end open towards the back of said rack, a second plunger slidably mounted within said second cylinder, said second plunger having a rolling member rollably engageable with said tapered recess, and a third spring for resiliently biasing said second plunger against said rack.

8. A rack and pinion steering device according to claim 7, wherein said third spring comprises a compression coiled spring.

9. A rack and pinion steering device according to claim 1, wherein said rack has a tapered recess on the back thereof at a location corresponding to the lengthwise center of the group of rack teeth, and wherein said spring device further comprises a second cylinder secured to said plunger, said second cylinder having one end open towards the back of said rack, an adjusting screw member threadedly engaged in said end member and one end of which extends into the other end of said second cylinder, a second plunger slidably mounted within said second cylinder, said second plunger having a rolling member rollably engageable with said tapered recess, and a third spring disposed between said second plunger and said adjusting screw member to resiliently bias said second plunger against said rack.

* * * * *